US012734494B2

(12) United States Patent
Englot

(10) Patent No.: US 12,734,494 B2
(45) Date of Patent: Sep. 15, 2026

(54) MICROINGREDIENT DISPENSING SYSTEM WITH EMPTY TRAY DETECTOR

(71) Applicant: Comco Controls Canada Ltd., Saskatoon (CA)

(72) Inventor: Derrick Englot, Saskatoon (CA)

(73) Assignee: Comco Controls Canada Ltd., Saskatoon (CA)

( * ) Notice: Subject to any disclaimer, the term of this patent is extended or adjusted under 35 U.S.C. 154(b) by 146 days.

(21) Appl. No.: 18/648,243

(22) Filed: Apr. 26, 2024

(65) Prior Publication Data

US 2025/0332558 A1 Oct. 30, 2025

(51) Int. Cl.

| | |
|---|---|
| ***B01F 35/21*** | (2022.01) |
| ***A23N 17/00*** | (2006.01) |
| ***B01F 25/312*** | (2022.01) |
| ***B01F 35/10*** | (2022.01) |
| ***B01F 35/221*** | (2022.01) |
| ***B01F 35/71*** | (2022.01) |
| *B01F 101/18* | (2022.01) |

(52) U.S. Cl.

CPC ...... *B01F 35/22162* (2022.01); *A23N 17/007* (2013.01); *B01F 25/31243* (2022.01); *B01F 35/1453* (2022.01); *B01F 35/2116* (2022.01); *B01F 35/2117* (2022.01); *B01F 35/71785* (2022.01); *B01F 2101/18* (2022.01)

(58) Field of Classification Search

CPC ............ B01F 35/22162; B01F 35/2117; B01F 35/71785; B01F 35/881

See application file for complete search history.

(56) References Cited

U.S. PATENT DOCUMENTS

| | | | | |
|---|---|---|---|---|
| 4,002,270 A * | 1/1977 | Reiner | .................. | B65G 27/32 198/572 |
| 8,277,111 B1 * | 10/2012 | Englot | ............. | B01F 35/71785 366/165.1 |

* cited by examiner

*Primary Examiner* — Jason K Niesz

(74) *Attorney, Agent, or Firm* — Eric W. Cernyar, P.C.

(57) ABSTRACT

A microingredient feed additive dispensing apparatus and method for adding microingredients to animal feed are described. The apparatus includes a frame, a microingredient receptacle with a front portion and a rear portion, a receptacle mount that mounts the receptacle to the frame, a plurality of microingredient bins oriented above the receptacle, one or more empty-receptacle-detecting sensors arranged along the front portion of the receptacle, and a driver coupled to the receptacle to feed the microingredients toward and over an exit boundary of the receptacle. Microingredients are concurrently dispensed from bins into the receptacle. The amount of the microingredients dispensed from each microingredient bin is calculated and controlled. One or more empty-collection-feeder sensors determine whether and when the collection feeder is empty, without weighing the whole collection bin. The apparatus and method provide a more efficient and accurate way to add microingredients to animal feed.

15 Claims, 4 Drawing Sheets

36
60
32
38
20
70
35
34
55

MICROINGREDIENT DISPENSING SYSTEM WITH EMPTY TRAY DETECTOR

FIELD OF THE INVENTION

This invention relates generally to microingredient dispensing systems, and more particularly to improvements to cleaning a microingredient dispensing system between batches.

BACKGROUND

The micro-ingredient dispensing system disclosed in U.S. Pat. No. 8,277,111, which is incorporated by reference into this specification, includes a plurality of dry microingredient containers that dispense their additives into a vibratory tray that feeds into a catch basin. Four load cells situated near the corners of the vibratory tray weigh the microingredients, one at a time. In order to accurately weigh each microingredient, the microingredients are dispensed serially and cumulatively weighed. After all the dry microingredients have been dispensed and cumulatively weighed, a wiper bar dispenses the microingredients into a catch basin.

SUMMARY

A superior micro-ingredient dispensing system and method is disclosed that allows the dry microingredient containers to concurrently dispense their microingredients and does away with weighing of the vibratory tray together with any microingredients carried by it. Because each of the microingredient bins are weighed individually, they can concurrently dispense their microingredients while a controller precisely controls the weight, volume, or other measure of the quantity of microingredients dispensed. Also, without weighing the entire vibratory tray and its contents, the system monitors whether the vibratory tray has fully emptied. As a portion of the frame supporting the rear of the vibratory frame pivots or flexes, some direct or derivative measurement—such as the pivot or flex angle or the load or strain on a frame member supporting the front of the vibratory frame—is obtained to determine whether the vibratory frame is empty or not.

DETAILED DESCRIPTION

Figures 1A, 1B:
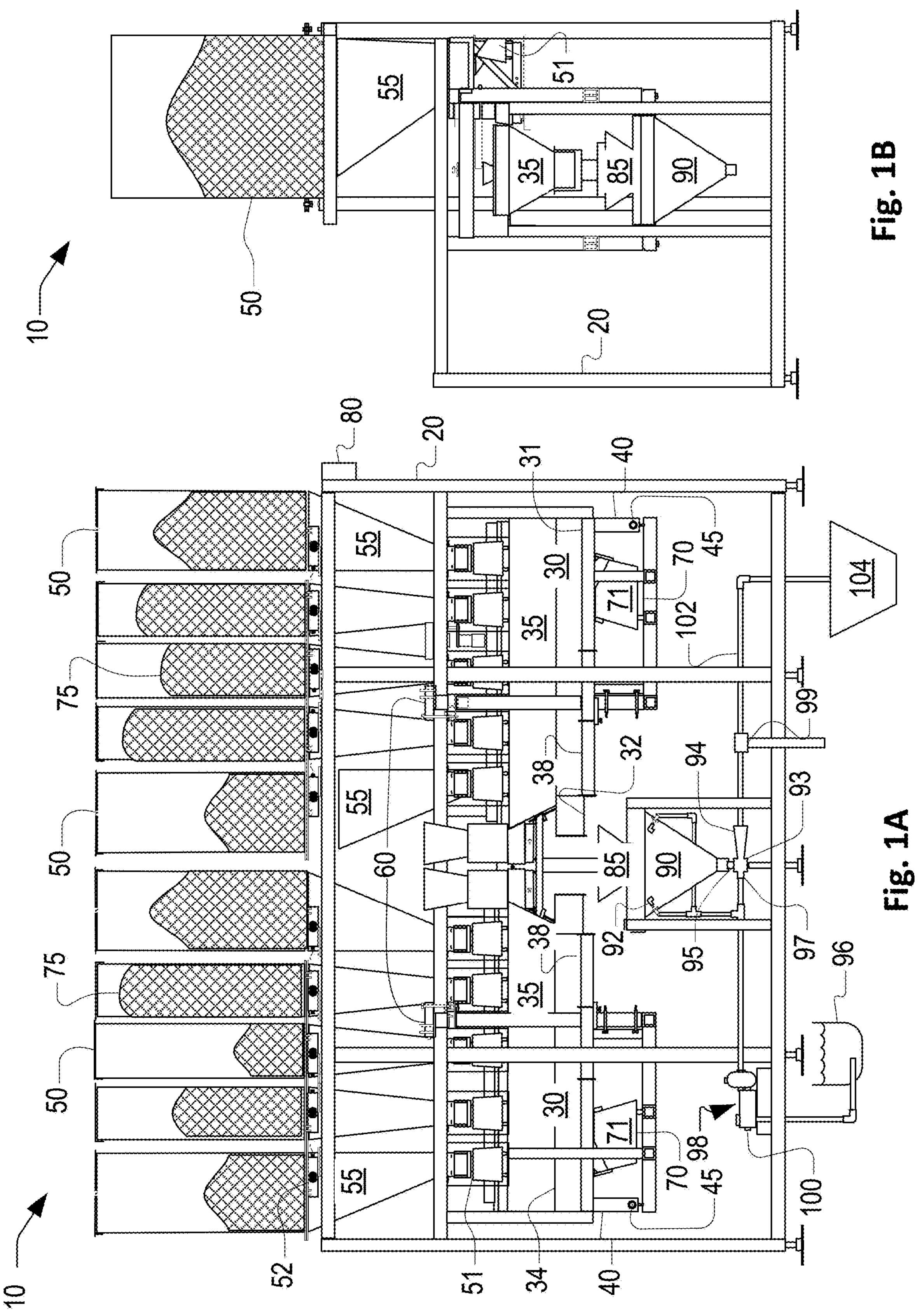
FIG. 1A is a diagrammatic depiction of the long side of one embodiment of a micro-ingredient feed additive system that utilizes ten microingredient bins and two collection feeders.
FIG. 1B is a diagrammatic depiction of the short side of the microingredient feed additive system of FIG. 1A.

FIGS. 1-4 illustrates embodiments of a microingredient feed additive dispensing apparatus 10 and method 200. The microingredient additive dispensing apparatus 10 comprises a frame 20, two microingredient receptacle 30, and for each receptacle 30 (also referred to as a collection feeder 30), a receptacle mount 40, a plurality of microingredient bins 50, one or more empty-receptacle-detecting sensors 60, and a driver 70. The microingredient bins 50 are oriented above the receptacles 30 so that when the ingredients are dispensed from the bins 50, they are received by the receptacles 30. Each receptacle 30 has a front portion 32 and a rear portion 34 (not necessarily of the same surface area; the rear portion 34 is just whatever is not defined as the front portion 32). The receptacle mount 40 mounts the rear portion 34 of the receptacle 30 to the frame 20. The driver 70 is coupled to the receptacle 30 to feed the microingredients 75 toward and over an exit boundary 36 of the receptacle. Generally, the microingredient feed additive dispensing apparatus 10 further comprises a controller 80 that coordinates the operations of the microingredient bins 50 and receptacles 30.

FIG. 1 illustrates an embodiment with two oppositely opposed receptacles 30, each receiving microingredients 75 from as many as five microingredient bins 50, feeding into common catch basin 85, and thereafter into an eductor bowl 90. A simpler alternative embodiment employs only one receptacle 30 and as few as two microingredient bins 50. A more complex alternative embodiment (not shown) employs three or four or even more receptacles 30, each receptacle 30 receiving microingredients 75 from a plurality of microingredient bins 50.

The receptacles 30 shown in FIG. 1A comprise a vibratory tray 38 along with slanted hopper walls 55 connected to the vibratory tray 38. The slanted hopper walls 55 direct dispensed microingredients 75 from the microingredient bins 50 between the walls 55 of the relatively narrow tray 38.

In a second embodiment that adds to the first embodiment, the receptacle 30 may be modestly sloped so that the combination of vibration and gravity suffices to advance the microingredients 75 over the receptacle's exit boundary 36. Also, the frame 20 or receptacle mount 40 carrying the receptacle 30 is pivoted or able to flex so that in response to being loaded with microingredients 75, the receptacle 30 tilts slightly downwardly—in addition to any slope it may have when empty—toward the receptacle's exit boundary 36. Stated another way, when the receptacle 30 is loaded with microingredients 75, the receptacle's front portion 32 descends very slightly, as much as is allowed—which is not very much—by the at least one empty-receptacle-detecting sensor 60 (such as a strain gauge).

The at least one empty-receptacle-detecting sensor 60 is arranged below, above, or to a front portion 32 of the receptacle 30. In one implementation, the at least one empty-receptacle-detecting sensor 60 comprises a strain gauge or one or more other forms of load cells proximate the front portion 32 of the receptacle 30. There may be an absence of empty-receptacle-detecting sensors 60—and indeed of any load cells—arranged proximate (e.g., below, above, or to) the rear portion 34 of the receptacle 30. To determine whether the receptacle 30 is empty, the controller 80 instead relies on a signal or signals that are exclusively generated by the at least one empty-receptacle-detecting sensors 60 that are proximate (e.g., arranged below, above, or to) the front portion 32 of the receptacle 30.

In the strain gauge implementation, the deformation of the strain gauge causes its electrical resistance, which is proportional to the strain experienced by the object, to change. By measuring this change in resistance, the load applied to the strain gauge is measured.

In a third embodiment that adds to the first embodiment, the frame 20, the receptacle 30, or receptacle mount 40 is—as in the second embodiment—pivoted or configured to flex in response to the receptable 30 being loaded with microingredients 75. Distinguishing the third from the second embodiment, the one or more empty-receptacle-detecting sensors 60 comprise an angle or proximity sensor that detects how much the receptacle 30 itself—or the receptacle mount 40 carrying the receptacle 20—has pivoted at a pivot point 45 or deflected or displaced from a default position associated with an empty receptacle. In one such implementation, the angle sensor is placed proximate the rear portion 34 of the receptacle 30. In another implementation, the proximity sensor could be placed anywhere within sight of a deflected or displaced portion of the frame 20, mount 40, or receptacle 30 when the receptacle 30 is loaded with microingredients 75.

In a fourth embodiment that adds to the first embodiment and is an alternative to the second and third embodiments, no pivoting or flexing is needed. The one or more empty-receptacle-detecting sensors 60 comprise one or more directed beams of light on one side of the receptacle 30, near the bottom of the receptacle 30, and one or more light sensors on the opposite side of the receptacle 30, again near the bottom of the receptacle 30. Because the presence of microingredients on the receptacle 30 blocks some of the light from reaching the sensors, this arrangement senses whether the receptacle 30 is empty.

In a fifth embodiment that is a more defined version of the previous embodiments, the controller 80 determines whether the receptacle 30 is empty without measuring the total weight of the receptacle 30 together with any of its microingredient contents 75. Instead, the controller 80 compares a value derived from the signals from the empty-bin-detecting sensors 60 with a predetermined value representing an empty receptacle 30 and determines if they are equal or equivalent. This allows the controller 80 to determine whether the receptacle 30 is empty without measuring the total weight of the receptacle 30 and its contents 75.

In a sixth embodiment building on any of the previous embodiments, the receptacle 30 comprises a vibratory tray 38 configured to bounce and thereby mix the microingredients 75 and discharge the microingredients 75 off of the tray 38. The vibratory tray 38 may be operated by a motor 71 or other means to vibrate the tray 38 and mix the microingredients 75. This satisfactorily achieves the aim of fully discharging the microingredients 75 from the tray 38.

In a seventh embodiment, the frame 20 includes one or more pivots 45 that enable the receptacle 30 to pivot enough for the empty-receptacle-detecting sensors 60 to detect whether the receptacle 30 is empty. The pivots 45 may be located at the rear portion 34 of the receptacle 30 or at other locations on the receptacle 30. The pivots 45 may allow the receptacle 30 to pivot in one or more directions, such as up and down or side to side. This prevents the rear of the frame 20 from carrying part of the load that would otherwise be borne by the one or more empty-receptacle-detecting sensors 60. As a substitute for pivots 45, the receptacle mount 40 may be resilient and have flexibility responsive and in relation to the weight and distribution of microingredients on the receptacle 30.

It would be wrong think the flex implementation would be more complex by requiring a determination of how much load that would otherwise be carried by the one or more empty-receptacle-detecting sensors 60 is carried instead by the flexing frame 20. The only value(s) that the one or more empty-receptacle-detecting sensors 60 need to detect is/are the value(s) associated with an empty receptacle 30. That should be approximately the same any time the receptacle 30 is empty, provided that the frame 20 is configured to flex consistently.

A given mass of microingredients on the front 32 of the receptacle 30 would cause a greater pivot of the frame 40—or in the alternative embodiment flex the frame 40 more—than the same mass of microingredients placed on the rear 34 of the receptacle 30. But this does not defeat the detection of when the vibratory tray 38 is empty, because—once again—the only value(s) that the one or more empty-receptacle-detecting sensors 60 need to detect is/are the values associated with an empty receptacle. The possibility of varying distributions of microingredients 75 on the receptacle 30 does not matter when the receptacle 30 is empty.

There are, however, adjustments that can be made to improve the detection of an empty tray. One adjustment is to provide sufficient lateral distance between the pivot 45 or, alternatively, a similarly located flex joint or location, and the position where microingredients 75 from the microingredient bin 50 closest to the pivot 45 settle on the receptacle 30. Indeed, unlike what is shown in FIG. 1, the pivot 45 could be placed several decimeters behind the rear 34 of the receptacle 30. Another adjustment is to provide sufficient slope and slope length in the rear 34 of the receptacle 30 to cause the microingredients dispensed closest to the utmost rear boundary of the receptacle 30 to slide forward so that their presence, or lack of presence, can be sensed.

In an eighth embodiment, the microingredient feed additive dispensing apparatus 10 further comprises a catch basin 85 situated below the discharge end of the vibratory tray 38 in order to receive the discharged additives. Furthermore, in one implementation an eductor bowl 90 is situated below the catch basin 85. Alternatively, the catch basin 85 serves as the eductor bowl 90. The apparatus 10 also includes one or more flush nozzles 92 situated adjacent an upper portion of the eductor bowl 90 (or alternatively, the catch basin 85) and operable to direct a liquid fluid into the eductor bowl 90. The eductor bowl 90 and flush nozzles 92 suspend the discharged microingredients 75 in water so that they can be entrained into a pressurized water flow through an eductor 93 situated downstream of an output of the eductor 93.

In a ninth embodiment building on the eighth embodiment, the microingredient feed additive dispensing apparatus 10 further comprises an eductor 93 situated below the eductor bowl 90 and in fluid connection with a suction inlet 95 of the eductor bowl 90. The apparatus 10 also includes a pressurized water supply 98 that uses a pump 100 to draw from a water supply 96 to supply a main inlet 97 of the eductor 93. The pressurized water source 96 is in fluid communication with both the eductor 93 and the flush nozzles 92, so that water is supplied to the flush nozzles 92 concurrently. Also, if there is a desire to shut off the water, the water is shut off to the eductor 93 and flush nozzles 92 simultaneously. The eductor 93 contributes to the mixing and dispersing of the discharged microingredients 75 prior to being directed to the batch mixer 104. Pressurized air is introduced at water inlet 99 downstream of the eductor 93.

In an tenth embodiment building on the ninth embodiment, the microingredient feed additive dispensing apparatus 10 further comprises a common connected supply of pressurized water to the eductor 93 and flush nozzles 92, so that when the supply of water is shut off, it cuts off the pressurized water to the eductor 93 and flush nozzles 92 simultaneously. The apparatus 10 also includes a pressurized source of air that is introduced into the delivery conduit 102 at an inlet downstream of the eductor 93.

A controller 80 is provided to operate the microingredient feed additive dispensing apparatus 10 in a microingredient-slurry-generating mode. In this mode, the controller 80 continually operates the pressurized water supply 96 to supply water to the eductor 93 and flush nozzles 92 until all of the microingredients have been received by the batch mixer 104. When pressurized water flows through a chamber of the eductor 93, it entrains the mixture of water and microingredients 75 received through the suction inlet 95 into the water jet. This creates a turbulent slurry, which is directed through the eductor outlet 94 and delivery conduit 102 to the batch mixer 104. In a line-flushing mode, the controller 80 ceases the dispensing of microingredients onto the receptacle 30 and stops vibration of the receptacle 30. But it continues to supply pressurized water to the flush nozzles and eductor main inlet 97 and optionally continues to supply pressurized air into the delivery conduit 102 for a prescribed period of time after it is determined that the microingredient receptacle 30 is empty. The pressurized air concurrently flushes the catch basin 85, the eductor 93, and the delivery conduit 102. This maintains and thoroughly cleans the apparatus 10 and ensures that the next microingredient-slurry-generating mode is properly performed.

Putting elements from the foregoing embodiments and a few additional optional details together (while excluding certain alternatives), a microingredient dispensing apparatus 10 is designed to accurately dispense small quantities of ingredients for various applications. The apparatus 10 includes individually controllable microingredient bins 50 mounted on a frame 20, with electrically controlled valves 51 at the bottom of each bin 50 for precise release of the ingredients. Each bin 50 is equipped with a load cell 52 for accurate weighing. The individually controllable microingredient bins 50 are arranged above a collection tray 30 that is also supported by the frame 20. Electrically controllable valves 51 at the bottom of each bin enable controlled release of the microingredients to the tray 30. Each bin 50 is weighed by a load cell 52 that forms part of a support for the bin 50.

The frame 20 and collection tray mount 40 carries the collection tray 30 via one or more pivots 35 proximate the tray's rear portion 34 and one or more load cells or strain gauges 60 bearing most of the load of and on the tray's front portion 32. The one or more load cells or strain gauges 60 are not used to weigh the whole collection tray 30, but instead to detect when all the microingredients 75 have advanced over the exit boundary 36, leaving the tray 30 empty.

The collection tray 30, supported by the frame 20 and collection tray mount 40, is designed to vibrate using a driver 70 positioned beneath the rear portion 34 of the tray 39. The driver 70 is positioned under the rear side 34 of the tray 30, but in front of the pivots 35 of the tray 30. The driver 70 is a motor 71 that vibrates the tray 30.

The tray 30 has an exit edge or boundary 36 over a catch basin 85, which may be shaped like an inverted truncated cone. In one option, an eductor bowl 90 is placed directly below the catch basin 85. The eductor bowl 90 includes flush nozzles 92 situated around the bowl's inside conical surface for cleaning purposes.

Four flush nozzles 92 are arranged around the inside conical surface of the eductor bowl 90, proximate the top edge of the bowl 90. The truncated cross section 91 of the eductor bowl 90 is fluidly connected to an eductor 93 positioned immediately below the eductor bowl 90. The main input 97 to the eductor 93 is fluidly connected to an output of the one or more valves 103. An input to the one or more valves 103 is fluidly connected to a water supply 96. Another input to the one or more valves 103 is fluidly connected to an air compressor 117. A delivery conduit 102 connects the output of the eductor 93 to a batch mixer 104, which may be stationed some distance from the microingredient dispensing apparatus 10.

Overall, the microingredient dispensing apparatus 10 is a complete system designed for precision dispensing and mixing of small quantities of ingredients for various industrial applications.

Figure 4:
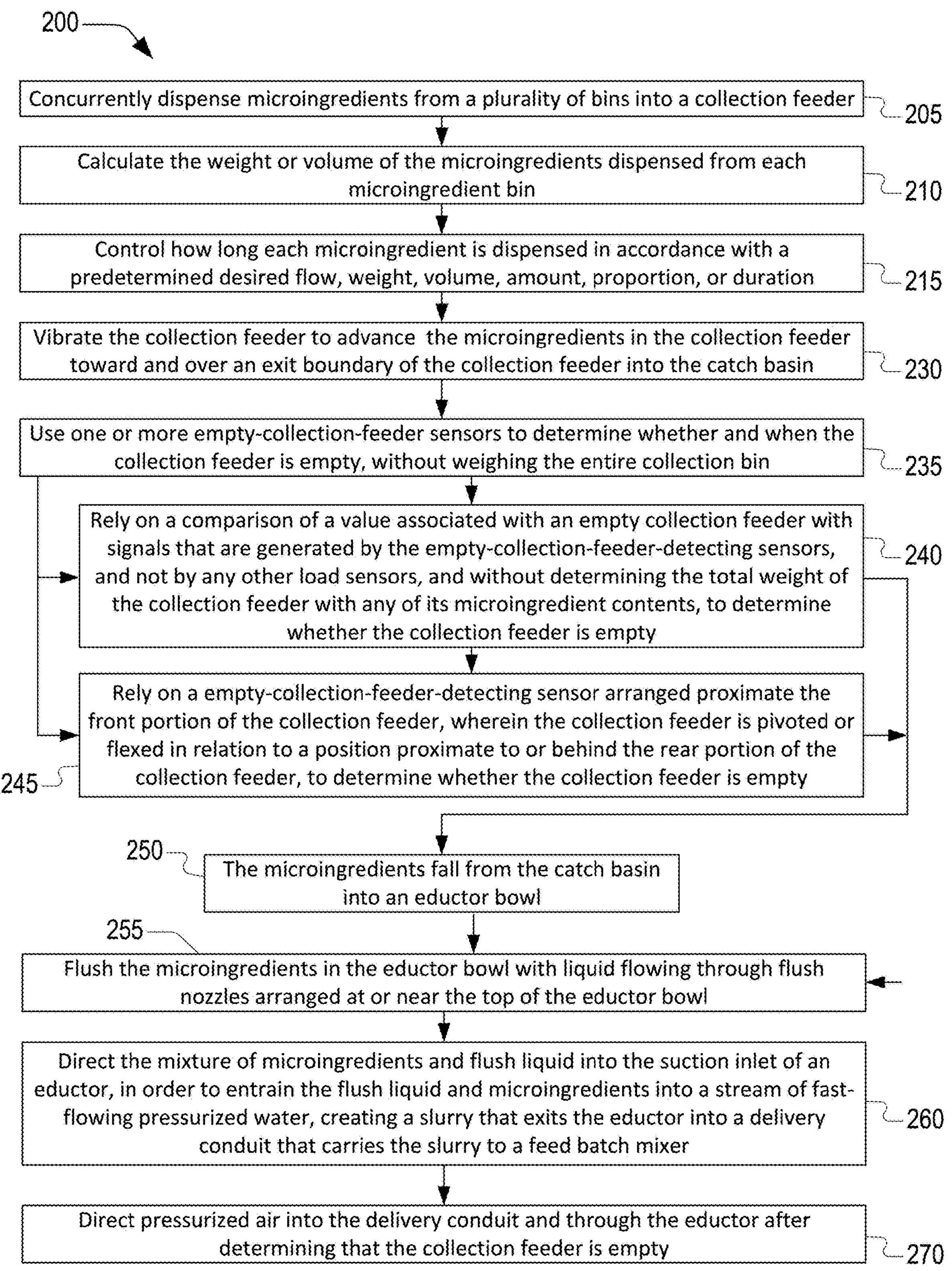
FIG. 4 is a flow chart illustrating one embodiment of a method of concurrently dispensing microingredients into a collection feeder.

FIG. 4 illustrates how the microingredient feed additive dispensing apparatus 10 is used in to add microingredients to animal feed. It illustrates a detailed method 200 comprising several actions or limitations 205-270. Not all these actions and limitations 205-270 are necessary, however. And different embodiments may pick and choose from the actions and limitations 205-270 listed.

At first, the method may comprise simultaneously dispensing microingredients 75 from microingredient bins 50 into the collection feeder 30 (block 205). The method may also comprise calculating the weight or volume of the microingredients dispensed from each microingredient bin 50 (block 210). Furthermore, the method may further comprise controlling how long each microingredient is dispensed in accordance with a predetermined desired flow, duration, weight, amount, or proportion of the associated microingredient (block 215). The method also may comprise vibrating the collection feeder to advance the microingredients on the collection feeder 30 toward and over the exit boundary 36 of the collection feeder 30 into the catch basin 85 (block 230).

Notably, one or more empty-collection-feeder sensors 60 determine whether and when the collection feeder 30 is empty, without weighing the whole collection bin (block 235). Many different embodiments may be considered to accomplish this objective.

Figure 2:
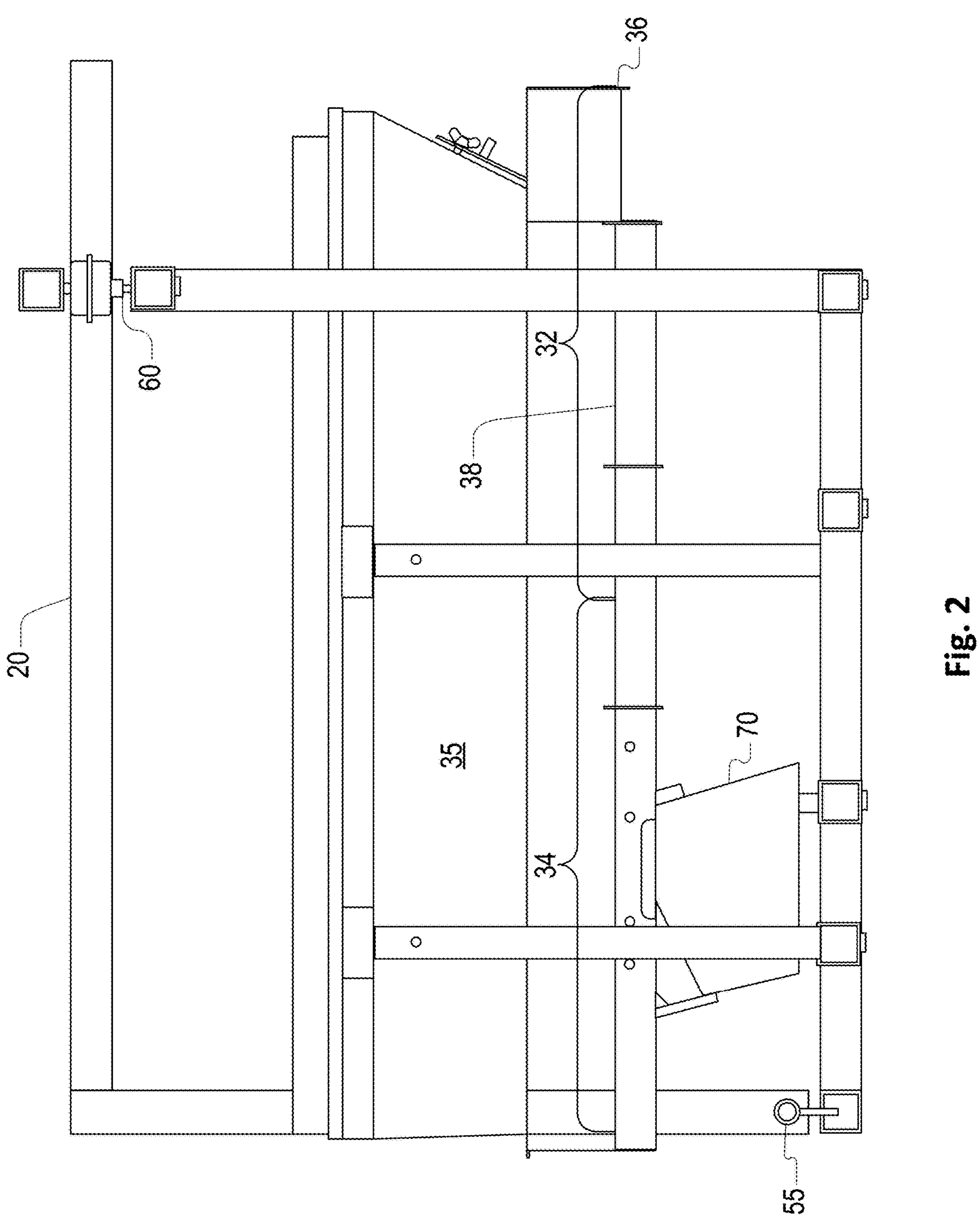
FIG. 2 is a diagrammatic illustration of portions of an embodiment of a microingredient feed additive system, including a single collection feeder, a driver used to vibrate the collection feeder, and a load cell or strain gauge that measures the load placed predominantly along the front of the collection feeder.
Figure 3:
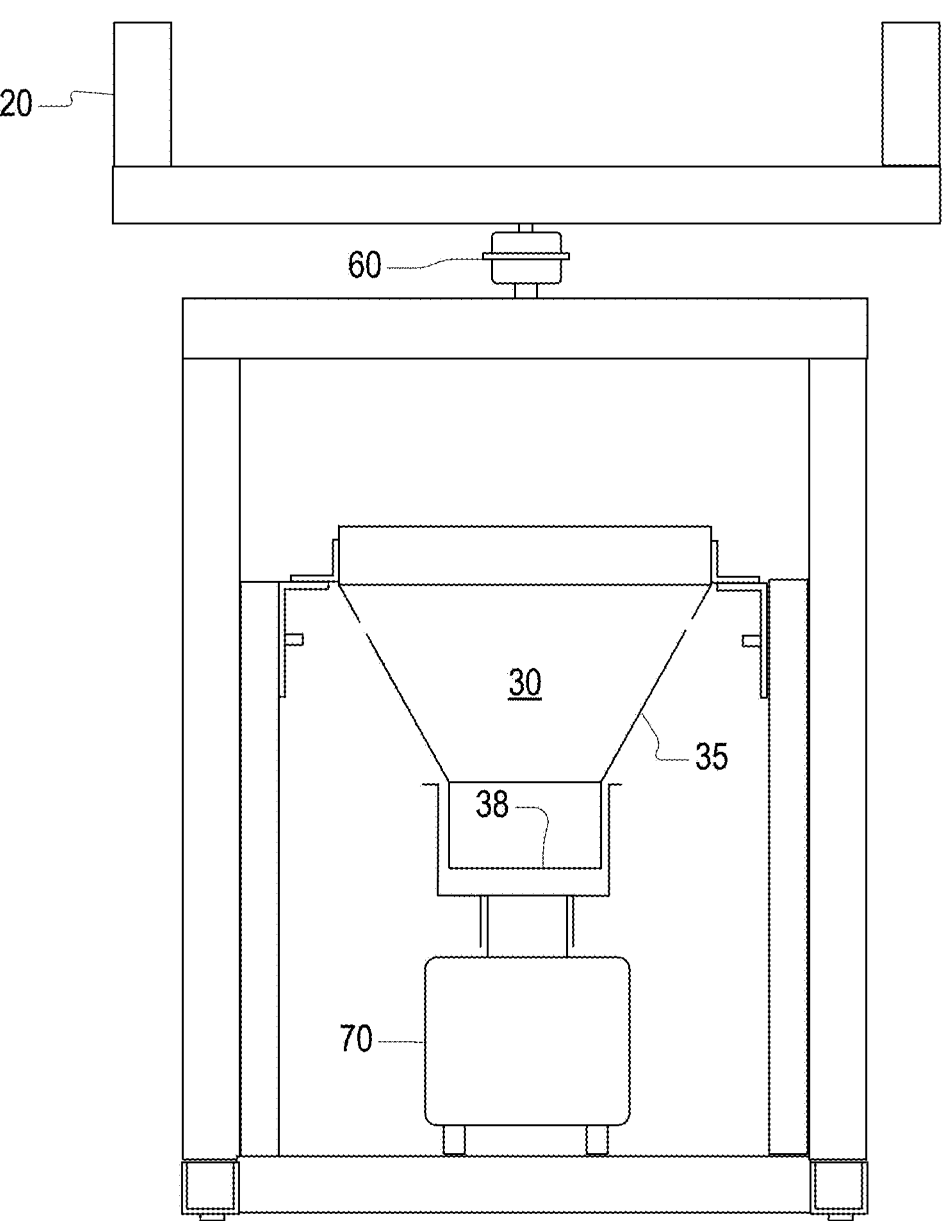
FIG. 3 is a diagrammatic illustration of portions of an embodiment of a microingredient feed additive system, including a catch basin, a frame supporting the collection feeder, and the load cell or strain gauge that measures the load placed predominantly by the front of the collection feeder.

As discussed in one of the apparatus embodiments, illustrated in FIGS. 1-3, the empty-receptacle-detecting sensors 60 are proximate to (e.g., arranged below, above, or to) a front portion 32 of the collection feeder 30 (block 235). Also, the collection feeder 30 is pivoted or allowed to flex about a point or area proximate the back of the rear portion 34 (block 245). The amount of pivoting or flexing may be limited to a small value.

The one or more empty-receptacle-detecting sensors 60 may comprise one or more strain gauges or one or more other forms of load cells proximate the front portion 32 of the collection feeder 30. In this embodiment, there may be an absence of empty-receptacle-detecting sensors 60—and indeed of any load cells—arranged below, above, or to the rear portion 34 of the collection feeder 30.

To determine whether the collection feeder 30 is empty, the controller 80 may rely on signals that are exclusively generated by the empty-receptacle-detecting sensors 60 that are arranged below, above, or to the front portion 32 of the collection feeder 30. More particularly, the controller 80 may compare a value associated with an empty collection feeder with signal(s) that the one or more empty-collection-feeder-detecting sensors generate, to determine whether the collection feeder is empty (block 240).

As discussed in the third and fourth apparatus embodiments, the empty-receptacle-detecting sensors 60 may instead comprise one or more angle or proximity sensors or one or more light sensors that detect whether microingredients (or any opaque substance) on the surface of the collection feeder 30 are blocking beams of light from reaching the sensors 60.

As the microingredients fall off the exit boundary 36 of the collection feeder 30 and into the catch basin 85, and from there to the eductor bowl 90 (block 250), flush nozzles 92 arranged at or near the top of the eductor bowl 90 direct liquid (e.g., water) into the catch basin 90 to mix with the microingredients (block 255). This mixture may be further agitated into a slurry by connecting the outlet of the eductor bowl 90 to the suction inlet 95 of an eductor 93. The eductor 93 entrains the slurry received from the eductor bowl 90 with pressurized water and ejects it through the eductor outlet 94. A delivery conduit 90 then carries the mixture or slurry away from the eductor outlet 94 past an air inlet 99 to a batch mixer 104 (block 260). Pressurized air is introduced at the air inlet 99 to make the mixture more turbulent, which aids in mixing the microingredients 75. The water continues to flow for a predetermined or sensor-determined period after the empty-collection-feeder-sensor(s) 60 detect(s) that the collection feeder 30 is empty. The pressurized air, which optionally starts being supplied after the collection feeder 30 is empty, also continues until, or approximately until, the water flow is terminated or completed (block 270).

Although the foregoing specific details describe several preferred embodiments of the invention, persons reasonably skilled in the art will recognize that various changes may be made in the details of the method and apparatus of this invention without departing from the spirit and scope of the invention as defined in the appended claims. Therefore, unless and to the extent expressly set forth in the claims, this invention is not limited to the specific details shown and described herein.

The following table lists reference numbers of the drawings with their corresponding element descriptions:

TABLE 1

| Reference Numbers and Element Descriptions | |
|---|---|
| 10 | Microingredient feed additive dispensing apparatus |
| 20 | Frame |
| 30 | Microingredient receptacle or collection feeder |
| 32 | Front portion |
| 34 | Rear portion |
| 35 | Slanted hopper walls connected to the vibratory tray |
| 36 | Exit boundary |
| 38 | Vibratory tray |
| 40 | Receptacle or collection tray mount |
| 45 | Pivot or pivot bearing |
| 50 | Plurality of microingredient bins |
| 51 | Valves |
| 52 | Load cells |
| 55 | Gravity hopper |
| 60 | One or more empty-receptacle-detecting sensors |
| 70 | Driver |
| 71 | Motor |
| 75 | Microingredients (hereinafter μ-ingredients) |
| 80 | Controller |
| 85 | Catch basin |
| 90 | Eductor bowl |
| 92 | One or more flush nozzles |
| 93 | Eductor |
| 94 | Eductor outlet |
| 95 | Suction inlet |
| 96 | Water supply |
| 97 | Main inlet |
| 98 | Pressurized water supply |
| 99 | Air inlet |
| 100 | Pump |
| 102 | Delivery conduit |
| 104 | Batch mixer |
| 200 | Method of adding μ-ingredients to animal feed |
| 205 | Concurrently dispense μ-ingredients from bins |
| 210 | Calculate weight/volume of dispensed μ-ingredients |
| 215 | Control dispensing of μ-ingredients |
| 230 | Vibrate the collection feeder |
| 240 | Compare sensed value with predetermined value |
| 245 | Allow collection feeder to pivot or flex |
| 250 | Microingredients descend from the catch basin into the eductor bowl |
| 255 | Flush μ-ingredients in catch basin with liquid |
| 260 | Direct μ-ingredients to feed batch mixer |
| 270 | Directing pressurized air through basin and eductor |

I claim:

1. A microingredient feed additive dispensing apparatus comprising:

a frame;

a microingredient receptacle having a front portion including an exit boundary and a rear portion opposite the front portion;

one or more receptacle mounts mounting the microingredient receptacle to the frame, including one or more pivots;

a plurality of microingredient bins oriented above the microingredient receptacle so that when ingredients are dispensed from the bins, they are received by the microingredient receptacle;

one or more empty-receptacle-detecting sensors arranged below, above, or to the front portion of the microingredient receptacle; and a driver coupled to the receptacle to feed the microingredients toward and over an exit boundary of the microingredient receptacle;

wherein the one or more pivots enable the microingredient receptacle to pivot enough for the empty-receptacle-detecting sensors to detect whether the microingredient receptacle is empty.

2. The microingredient feed additive dispensing apparatus of claim 1, further comprising:

a controller;

wherein there is an absence of empty-receptacle-detecting sensors arranged below, above, or to the rear portion of the microingredient receptacle, so that to determine whether the microingredient receptacle is empty, the controller relies on signals that are exclusively generated by the empty-receptacle-detecting sensors that are arranged below, above, or to the front portion of the microingredient receptacle.

3. The microingredient feed additive dispensing apparatus of claim 1, wherein the microingredient receptacle comprises a vibratory tray configured to mix the microingredients and discharge the microingredients off the vibratory tray.

4. The microingredient feed additive dispensing apparatus of claim 1, wherein the empty-receptacle-detecting sensors are strain gauges whose resistance varies with the load it bears, and wherein the predetermined value is a resistance value or a voltage or current value that varies with the resistance of the strain gauge.

5. The microingredient feed additive dispensing apparatus of claim 1, wherein the microingredient receptacle is borne by the frame, which is constructed to flex in response to a load presented by the microingredient receptacle and any microingredients on it.

6. The microingredient feed additive dispensing apparatus of claim 1, for each of a subset of the microingredient bins, one or more load cells configured to weigh the bin and its contents, if any.

7. The microingredient feed additive dispensing apparatus of claim 1, wherein a controller determines whether the microingredient receptacle is empty by comparing a value derived from the signals from the empty-receptacle-detecting sensors with a predetermined value representing an empty microingredient receptacle and determining if they are equal or equivalent.

8. The microingredient feed additive dispensing apparatus of claim 7, wherein the empty-receptacle-detecting sensors are strain gauges whose resistance varies with the load it bears, and wherein the predetermined value is a resistance value or a voltage or current value that varies with the resistance of the strain gauge.

9. A microingredient feed additive dispensing apparatus comprising:

a frame;

a microingredient receptacle having a front portion including an exit boundary and a rear portion opposite the front portion;

one or more receptacle mounts mounting the microingredient receptacle to the frame;

a plurality of microingredient bins oriented above the microingredient receptacle so that when ingredients are dispensed from the bins, they are received by the microingredient receptacle;

one or more empty-receptacle-detecting sensors arranged below, above, or to the front portion of the microingredient receptacle;

a driver coupled to the receptacle to feed the microingredients toward and over an exit boundary of the microingredient receptacle; and a controller;

wherein there is an absence of empty-receptacle-detecting sensors arranged to, above, and/or below the rear portion of the microingredient receptacle, so that to determine whether the microingredient receptacle is empty, the controller determines whether the microingredient receptacle is empty by relying on signals that are exclusively generated by the empty-receptacle-detecting sensors that are arranged below, above, or to the front portion of the microingredient receptacle and without measuring the total weight of the microingredient receptacle together with any of its microingredient contents.

10. The microingredient feed additive dispensing apparatus of claim 9, wherein the controller determines whether the microingredient receptacle is empty by comparing a value derived from the signals from the empty-receptacle-detecting sensors with a predetermined value representing an empty microingredient receptacle and determining if they are equal or equivalent.

11. The microingredient feed additive dispensing apparatus of claim 9, wherein the one or more microingredient receptacle mounts include one or more pivots that enable the microingredient receptacle to pivot enough for the empty-receptacle-detecting sensors to detect whether the microingredient receptacle is empty.

12. The microingredient feed additive dispensing apparatus of claim 9, wherein the microingredient receptacle is borne by the frame, which is constructed to flex in response to a load presented by the microingredient receptacle and any microingredients on it.

13. The microingredient feed additive dispensing apparatus of claim 9, for each of a subset of the microingredient bins, one or more load cells configured to weigh the bin and its contents, if any.

14. The microingredient feed additive dispensing apparatus of claim 9, wherein the microingredient receptacle comprises a vibratory tray configured to mix the microingredients and discharge the microingredients off the vibratory tray.

15. A microingredient feed additive dispensing apparatus comprising:

a frame;

a microingredient receptacle having a front portion and a rear portion;

one or more receptacle mounts mounting the microingredient receptacle to the frame;

a plurality of microingredient bins oriented above the microingredient receptacle so that when ingredients are dispensed from the bins, they are received by the microingredient receptacle;

one or more empty-receptacle-detecting sensors arranged below, above, or to the front portion of the microingredient receptacle; and a driver coupled to the receptacle to feed the microingredients toward and over an exit boundary of the microingredient receptacle;

a catch basin and/or an eductor bowl situated below the discharge end of the microingredient receptacle to receive the discharged additives; and one or more flush nozzles situated adjacent an upper portion of the catch basin and/or eductor bowl and operable to direct a liquid fluid into the catch basin and/or eductor bowl;

an eductor situated below the catch basin and/or eductor bowl and in fluid connection with a suction inlet of the catch basin and/or eductor bowl; and a pressurized water supply in fluid connection with a main inlet of the eductor;

wherein the pressurized water supply is in fluid communication with both the eductor and the flush nozzles, so that water is supplied and cut-off to the eductor and flush nozzles concurrently;

a pressurized air supply that introduces air;

a delivery conduit wherein a first end is in fluid connection with an eductor outlet and a second end is in fluid connection with a batch mixer; and an air inlet that introduces air into the delivery conduit at a point downstream of the eductor.

* * * * *